(12) United States Patent
Shah et al.

(10) Patent No.: US 11,017,480 B2
(45) Date of Patent: *May 25, 2021

(54) IDENTIFYING PROPERTY USAGE TYPE BASED UPON SMART SENSOR DATA

(71) Applicant: State Farm Mutual Automobile Insurance Company, Bloomington, IL (US)

(72) Inventors: Rajiv Shah, Bloomington, IL (US); Michael S. Jacob, Le Roy, IL (US); Sripriya Sundararaman, Plano, TX (US); Jeffrey D. Hevrin, Bloomington, IL (US); Jeffrey G. Kinsey, Bloomington, IL (US); Phillip Sangpil Moon, Bloomington, IL (US); Ellakate LeFebre, Bloomington, IL (US); Sunish Menon, Normal, IL (US); Jeffrey W. Stoiber, Atlanta, GA (US); James Dykeman, Bloomington, IL (US); Erin Olander, Lincoln, IL (US); Lucas Allen, East Peonia, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,408

(22) Filed: Jun. 19, 2020

(65) Prior Publication Data

US 2020/0320639 A1 Oct. 8, 2020

Related U.S. Application Data

(63) Continuation of application No. 16/452,625, filed on Jun. 26, 2019, now Pat. No. 10,726,500, which is a
(Continued)

(51) Int. Cl.
G06Q 40/08 (2012.01)
G06Q 50/16 (2012.01)
H04Q 9/00 (2006.01)

(52) U.S. Cl.
CPC ............... *G06Q 40/08* (2013.01); *H04Q 9/00* (2013.01); *G06Q 50/163* (2013.01); *H04Q 2209/10* (2013.01)

(58) Field of Classification Search
None
See application file for complete search history.

(56) References Cited

U.S. PATENT DOCUMENTS

9,609,003 B1 3/2017 Chmielewski et al.
9,710,858 B1 7/2017 Devereaux et al.
(Continued)

*Primary Examiner* — Curtis A Kuntz
*Assistant Examiner* — Jerold B Murphy (57) ABSTRACT

A computer-implemented method for identifying a property usage type based upon sensor data includes, with customer permission or affirmative consent, receiving data generated by various sensors; generating a report that includes a listing of events recorded by each sensor; analyzing data from the report to determine a property usage type score; receiving data regarding types and levels of insurance coverage associated with the property usage type score; receiving data derived from a homeowner's insurance policy; comparing the types and levels of insurance coverage associated with the property usage type score with the types and levels of insurance coverage from the homeowner's current insurance policy; and transmitting a message to the homeowner to update their insurance policy if there are differences between (i) the insurance coverage that the homeowner has, and (ii) the insurance coverage the homeowner should have based upon the property usage type score.

18 Claims, 6 Drawing Sheets

Related U.S. Application Data continuation of application No. 15/403,376, filed on Jan. 11, 2017, now Pat. No. 10,387,966.

(60) Provisional application No. 62/357,667, filed on Jul. 1, 2016, provisional application No. 62/278,651, filed on Jan. 14, 2016.

(56) References Cited

U.S. PATENT DOCUMENTS

| | | |
|---|---|---|
| 10,387,966 B1 * | 8/2019 | Shah ................... H04Q 9/00 |
| 10,726,494 B1 | 7/2020 | Shah et al. |
| 10,726,500 B1 * | 7/2020 | Shah ................... G06Q 40/08 |
| 2003/0117279 A1 | 6/2003 | Ueno et al. |
| 2006/0184326 A1 | 8/2006 | McNally et al. |
| 2006/0261962 A1 | 11/2006 | Berenguer et al. |
| 2008/0243391 A1 | 10/2008 | Ohshiro et al. |
| 2013/0096954 A1 | 4/2013 | Bodas |
| 2014/0136242 A1 | 5/2014 | Weekes et al. |
| 2014/0358592 A1 | 12/2014 | Wedig et al. |
| 2015/0025917 A1 | 1/2015 | Stempora |
| 2016/0189513 A1 | 6/2016 | Sloo |
| 2016/0189526 A1 | 6/2016 | Kennedy et al. |
| 2016/0225240 A1 | 8/2016 | Voddhi et al. |
| 2016/0300479 A1 | 10/2016 | Modi et al. |

\* cited by examiner

IDENTIFYING PROPERTY USAGE TYPE BASED UPON SMART SENSOR DATA

RELATED APPLICATIONS

The current patent application is a continuation of U.S. patent application Ser. No. 16/452,625, filed Jun. 26, 2019, titled "IDENTIFYING PROPERTY USAGE TYPE BASED UPON SMART SENSOR DATA," which is a continuation of U.S. patent application Ser. No. 15/403,376, filed Jan. 11, 2017, entitled "Identifying Property Usage Type Based Upon Smart Sensor Data" (now U.S. Pat. No. 10,387,966), which claims priority benefit, with regard to all common subject matter, of U.S. Provisional Application No. 62/278,651, titled "IDENTIFYING PROPERTY USAGE TYPE BASED UPON SMART SENSOR DATA", filed Jan. 14, 2016, and U.S. Provisional Application No. 62/357,667, titled "IDENTIFYING PROPERTY USAGE TYPE BASED UPON SMART SENSOR DATA", filed Jul. 1, 2016. The listed, earlier-filed applications are hereby incorporated by reference in their entireties into the current application.

FIELD OF THE INVENTION

The present disclosure generally relates to devices and methods for identifying a type of usage of a homeowner's house based upon sensor data.

BACKGROUND

Accurate determination of the usage of a house may result in generating the correct rate of a homeowner's insurance premium. For example, a house that is occupied full time may have a different level of risk than a vacation house, which is occupied only occasionally. In addition, a house that is being used, in full or in part, to run a business may have different types of risks than a fully residential house. However, homeowners may not provide accurate information when they first apply for the insurance policy, and living situations that have changed over time may go unreported to the homeowner's insurance agent, each of which may result in an insured paying the wrong amount for the insurance premium. Furthermore, sending an inspector to the residence or property of each customer to verify or determine the usage or status of the house is time-consuming and costly. Conventional methods may have other drawbacks as well.

BRIEF SUMMARY

Embodiments of the present technology relate to computer-implemented methods, computing devices, and computer-readable media for identifying a property usage type based upon sensor data. The embodiments provide for receiving data generated by a plurality of sensors positioned in and around a house, and generating a report that includes a listing of a plurality of events recorded by each sensor. The data from the report may be analyzed to determine a property usage type score. Types and levels of insurance coverage that are associated with the property usage type score are compared with types and levels of insurance coverage that are included in the homeowner's current insurance policy. If there are differences between the insurance coverage that the homeowner has and the insurance coverage the homeowner should have based upon the property usage type score, then a message is transmitted to the homeowner, insurance agent, or underwriter to update the insurance policy.

In a first aspect, a computer-implemented method for identifying a property usage type based upon sensor data may be provided. The method may include, with the customer's permission or affirmative consent: (1) receiving data that was generated by a plurality of sensors positioned in and around a house; (2) generating a report that includes a listing of a plurality of events recorded by each sensor; (3) analyzing data from the report to determine a property usage type score; (4) receiving data regarding types and levels of insurance coverage that are associated with the property usage type score; (5) receiving data that is derived from a homeowner's insurance policy including types and levels of insurance coverage included in the insurance policy; (6) comparing the types and levels of insurance coverage that are associated with the property usage type score with the types and levels of insurance coverage that are included in the homeowner's current insurance policy; and/or (7) transmitting a message to the homeowner, insurance agent, or underwriter to update the insurance policy if there are differences between the insurance coverage that the homeowner has and the insurance coverage the homeowner should have based upon the property usage type score. The method may include additional, fewer, or alternative actions, including those discussed elsewhere herein.

In another aspect, a computing device for identifying a property usage type based upon sensor data may be provided. The computing device may include a communication element, a memory element, and/or a processing element. The communication element may receive data generated by a plurality of sensors positioned in and around a house and data that is derived from a homeowner's insurance policy. The memory element may be electronically coupled to the communication element and may store data and executable instructions. The processing element may be electronically coupled to the communication element and the memory element. The processing element may be configured to receive data that was generated by a plurality of sensors positioned in and around a house; generate a report that includes a listing of a plurality of events recorded by each sensor; analyze data from the report to determine a property usage type score; receive data regarding types and levels of insurance coverage that are associated with the property usage type score; receive data that is derived from a homeowner's insurance policy including types and levels of insurance coverage included in the insurance policy; compare the types and levels of insurance coverage that are associated with the property usage type score with the types and levels of insurance coverage that are included in the homeowner's current insurance policy; and/or transmit a message to the homeowner, insurance agent, or underwriter to update the insurance policy if there are differences between the insurance coverage that the homeowner has and the insurance coverage the homeowner should have based upon the property usage type score. The computing device may include additional, fewer, or alternate components and/or functionality, including that discussed elsewhere herein.

In yet another aspect, a computer-readable medium for identifying a property usage type based upon sensor data may be provided. The computer-readable medium may include an executable program stored thereon, wherein the program instructs a processing element of a computing device to perform the following steps: (1) receiving data that was generated by a plurality of sensors positioned in and around a house; (2) generating a report that includes a listing of a plurality of events recorded by each sensor; (3) analyzing data from the report to determine a property usage type score; (4) receiving data regarding types and levels of insurance coverage that are associated with the property usage type score; (5) receiving data that is derived from a homeowner's insurance policy including types and levels of insurance coverage included in the insurance policy: (6) comparing the types and levels of insurance coverage that are associated with the property usage type score with the types and levels of insurance coverage that are included in the homeowner's current insurance policy; and/or (7) transmitting a message to the homeowner, insurance agent, or underwriter to update the insurance policy if there are differences between the insurance coverage that the homeowner has and the insurance coverage the homeowner should have based upon the property usage type score. The program stored on the computer-readable medium may instruct the processing element to perform additional, fewer, or alternative actions, including those discussed elsewhere herein.

In yet another aspect, a computer-implemented method for determining if a homeowner is on vacation may be provided. The method may include: (1) receiving data that was generated by a plurality of motion sensors positioned in and around a house, the data including motion events and temperature data from each motion sensor; (2) determining a daily temperature difference for each motion sensor; (3) determining a first number of occupancy events per day as a total of motion events from motion sensors whose daily temperature difference is less than a first threshold; (4) receiving data that was generated by a plurality of non-motion sensors positioned in the house, the data including activity events data from each non-motion sensor; (5) determining a second number of occupancy events per day as a total of activity events from the non-motion sensors; (6) adding, once per day, the first number of occupancy events to the second number of occupancy events for a predetermined number of previous days to produce a sum; and (7) determining that the homeowner is on vacation if the sum is less than a second threshold. The method may include additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of devices and methods disclosed therein. It should be understood that each Figure depicts an embodiment of a particular aspect of the disclosed devices and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments address a computer-centric challenge or problem with a solution that is necessarily rooted in computer technology and may relate to, inter alia, methods and devices for identifying a property usage type based upon sensor data. A plurality of sensors may be installed in and around a homeowner's house. The sensors may include motion detectors, contact sensors, door lock keypads, thermostats, security systems, key fobs, and the like. The sensors may record data regarding the activity, such as movements throughout, or activity within, the house; usage of the thermostat and the security system; usage of electricity, water, natural gas, heating oil; etc., of or by the residents occupying the house.

The data may be transmitted from the sensors to a central hub which forwards the data to a computing device that is executing a software application. At various intervals, the computing device may generate a report that summarizes the sensor data. The data from the report may be input into a machine learning program, which may analyze the time of day and period of occupancy data, among others, and/or may recognize patterns of activity from the sensor data and may determine a property usage type score. The property usage type score may indicate whether the house is likely to be a full-time residence, a vacation house, a home business, or the like. The software application may also receive data derived from the homeowner's insurance policy. The software application may further compare current levels of coverage with levels of coverage required for the property usage type indicated by the property usage type score. If there are differences in the two levels of coverage, then the software application may generate and send notifications to the customer suggesting to update the coverage of their insurance policy. The software application may additionally suggest devices and/or systems, such as security systems, to the customer that may provide additional protection for the house, based upon the type of data received from the sensors and the property usage type score.

The embodiments described herein do not simply use a computing device or computer to automate was done previously, but they rather improve upon what was previously done with computers, solving a computer specific problem. Furthermore, the embodiments expand the functionality of existing computer software, local or on a computer network, by addressing a problem specific to the realm of computers. In addition, the embodiments do not identify a property usage type generally, but rather provide specific methods and devices that utilize sensor data and determine a property usage type score to identify the property usage type. Hence, the embodiments do not preempt all ways of identifying a property usage type.

Further, the present embodiments may solve the problem of determining home usage by data mining events through home telematics data. This approach may predict home occupancy and usage. The first step in the process may be to collect relevant home sensor data with customer permission. The second step of the process may be to use rules that will indicate either occupancy or usage of the home. Some examples of activity that indicate occupancy or usage of the home may include: (1) locking or unlocking the home; (2) a contact sensor indicating a door or window was or is opened or closed; (3) a key fob arriving or departing the home; (4) a light switch or other button activated device being controlled from the home; (5) the Intruder Alert system being armed/disarmed from the device or a key fob; (6) the garage door opening or closing; (7) any alarm of any type being deactivated from the alarm device; and/or (8) indoor motion detectors (indoor motions sensors were identified as such based on limited temperature variation). The next step may include processing the sum of all these events and determining occupancy or usage. The rules may be used to create an occupancy or usage score, which over time could indicate: if the property is used for business and type of business (e.g., daycare); if the property is a vacation home; and/or occupancy rate in the property (how often the home is occupied in a year). The score may be able to indicate whether a manual inspection of the property is warranted.

Exemplary Computing System

Figure 1:
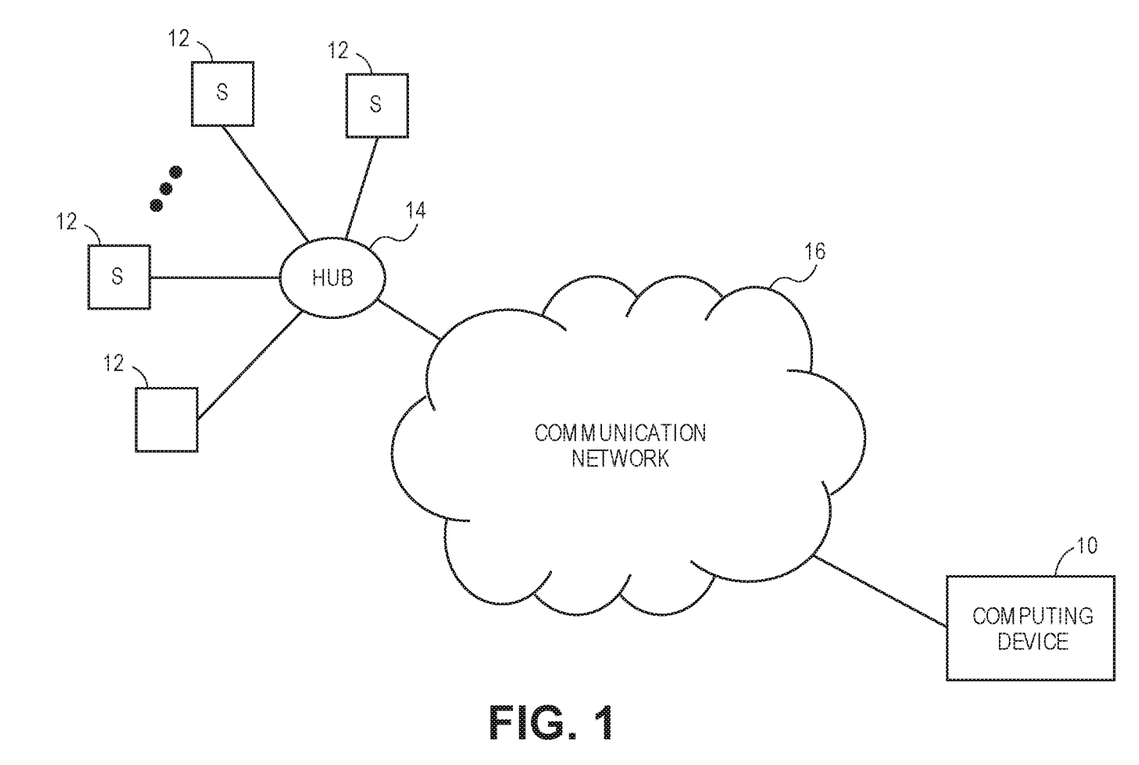
FIG. 1 illustrates an exemplary system, constructed in accordance with various embodiments, and including a computing device configured to receive data from a plurality of sensors through a communication network.

FIG. 1 depicts an exemplary environment in which embodiments of a computing device 10 for identifying a property usage type based upon sensor data may be utilized. The computing device 10 may receive data from a plurality of sensors 12 that are installed in the homeowner's house. The sensors 12 may transmit the data to a central hub 14, which in turn, transmits the data to the computing device 10 through a communication network 16.

Figure 2:
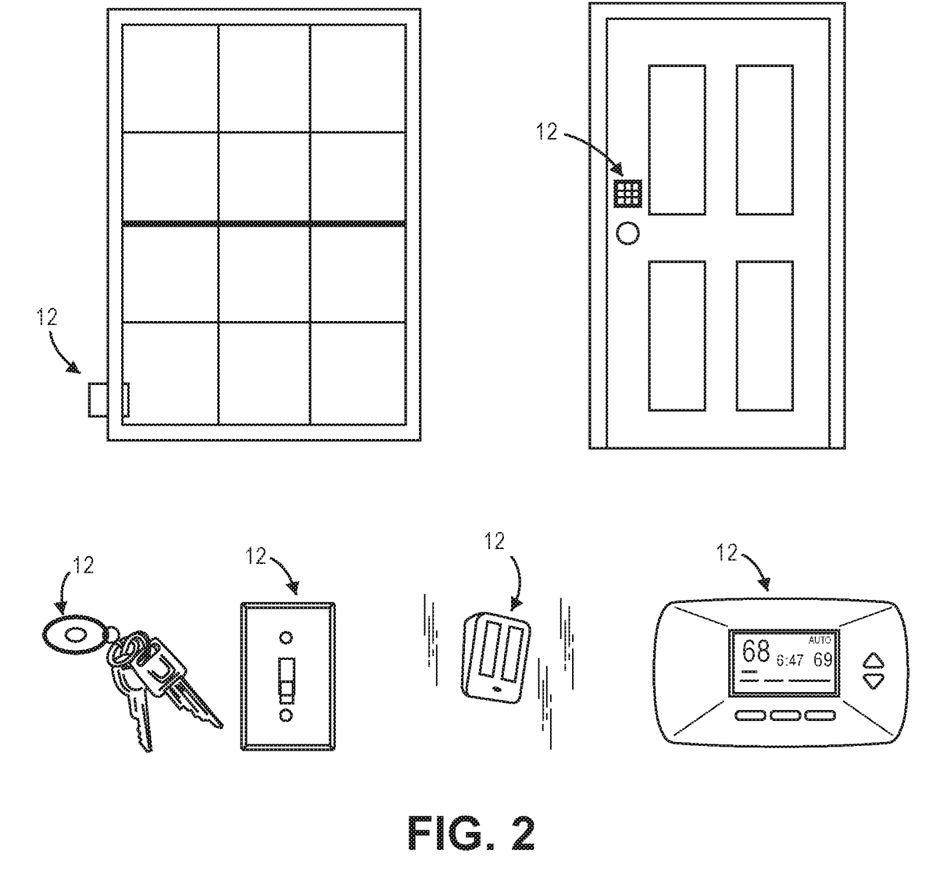
FIG. 2 illustrates a plurality of exemplary sensors that may be used with the system of FIG. 1.

The sensors 12 may be distributed around the homeowner's house or may be carried by the homeowner or other residents of the house. The sensors 12 may include, as shown in FIG. 2, examples such as contact sensors which are installed on a window or door and detect when the window or door is open; thermostats which detect and set the temperature (or monitor operation of an air conditioning unit or furnace) within the house; door locks or door knobs which detect when someone enters or leaves the house and whether the door was locked or unlocked; key fobs which detect when the possessor of the fob is in or around the house; light switches which detect when someone in the house turns on a light or other electronic device; sensors that detect operation of various electronic components (e.g., television or entertainment centers); sensors or flow sensors that detect operation of water faucets, showers, or toilets; sensors or monitors that monitor the electrical usage within the house; and motion or infrared sensors which detect when people or animals are moving inside or outside the house. In some instances, the motion detectors may further detect whether the motion is consistent with human motion or animal motion.

The sensors 12 may further include components not shown in the figures, such as mobile devices (e.g., smartphones) running applications that provide owner identification or that are identified through Bluetooth™, WiFi, or cellular communication; garage door openers which detect when someone accesses the garage; senior care pendants which send alerts when the possessor of the pendant needs assistance; security systems which may be unarmed when residents are in the house and armed when residents are away security cameras which capture still images or video of humans or animals moving about the house; and the like.

The sensors 12 each may include communications hardware that allow the sensor 12 to communicate, either through wires or wirelessly (over one or more radio frequency links), with the central hub 14, which is typically located within the house. In other embodiments, the central hub 14 may not be utilized and each sensor 12 may communicate directly with the communication network 16.

Each sensor 12 may record, for example with a (time of day) timestamp, when activity occurred, such as when a window was opened or closed, when a door was accessed, when someone left or arrived at the house, and the like. Some sensors 12, such as smartphones, key fobs, or pendants, may also record an identification of who initiated the activity. After the event occurs, or at predetermined time intervals, the sensor 12 may transmit data, such as a data packet, which includes, for example, an identification of the sensor 12, a timestamp of when the activity occurred, an indication of the activity, such as contact opened, door accessed, etc., and the identification of the person who initiated the activity, if applicable. The data may be transmitted to the central hub 14 or to the computing device 10 (such as transmitting the home data to an insurance provider remote server for analysis of available insurance discounts by the remote server with the home owner's or an insured's permission or affirmative consent).

The central hub 14 may include a plurality of ports (wired, wireless, or both) configured to receive data from the sensors 12 and at least one output port configured to transmit data to the communication network 16. The central hub 14 may further include buffering or other temporary data storage capabilities. As soon as the central hub 14 receives data from the sensors 12, or at predetermined intervals, the central hub 14 may transmit the data to the computing device 10 through the communication network 16.

The communication network 16 generally allows communication between the hub 14 and the computing device 10 or communication directly from the sensors 12 to the computing device 10. The communication network 16 may include local area networks, metro area networks, wide area networks, cloud networks, the Internet, and the like, or combinations thereof. The communication network 16 may be wired, wireless, or combinations thereof and may include components such as switches, routers, hubs, access points, and the like. The sensors 12 may connect to the communication network 16 either through wires, such as electrical cables or fiber optic cables, or wirelessly, such as radio frequency (RF) communication using wireless standards such as Bluetooth® or the Institute of Electrical and Electronic Engineers (IEEE) 802.11.

Figure 3:
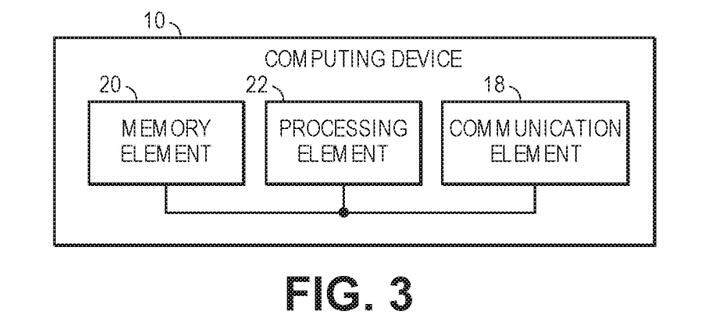
FIG. 3 illustrates various components of the computing device shown in block schematic form.

The computing device 10 may be embodied by workstation computers, desktop computers, laptop computers, palmtop computers, notebook computers, tablets or tablet computers, application servers, database servers, file servers, web servers, or the like, or combinations thereof. The computing device 10, as shown in FIG. 3, may broadly comprise a communication element 18, a memory element 20, and a processing element 22.

The communication element 18 generally allows the computing device 10 to receive data from the communication network 16. The communication element 18 may include signal or data transmitting and receiving circuits, such as antennas, amplifiers, filters, mixers, oscillators, digital signal processors (DSPs), and the like. The communication element 18 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. In addition, the communication element 18 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 18 may establish communication through connectors or couplers that receive metal conductor wires or cables which are compatible with networking technologies such as Ethernet. In certain embodiments, the communication element 18 may also couple with optical fiber cables. The communication element 18 may be in communication with the processing element 22 and the memory element 20.

The memory element 20 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 20 may be embedded in, or packaged in the same package as, the processing element 22. The memory element 20 may include, or may constitute, a "computer-readable medium." The memory element 20 may store the instructions, code, code segments, software, firmware, programs, applications, apps, services, daemons, or the like that are executed by the processing element 22. The memory element 20 may also store settings, data, documents, sound files, photographs, movies, images, databases, and the like.

The processing element 22 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 22 may generally execute, process, or run instructions, code, code segments, software, firmware, programs, applications, apps, processes, services, daemons, or the like. The processing element 22 may also include hardware components such as finite-state machines, sequential and combinational logic, and other electronic circuits that may perform the functions necessary for the operation of the current invention. The processing element 22 may be in communication with the other electronic components through serial or parallel links that include address busses, data busses, control lines, and the like.

The processing element 22 may be configured or programmed to perform the following functions through hardware, software, firmware, or combinations thereof. In various embodiments, the processing element 22 may execute a software application which includes code that instructs the processing element 22 to perform the steps, functions, and operations discussed below. The processing element 22, through the communication element 18, may receive data from either the central hub 14 or the sensors 12. The processing element 22 may analyze the data received from the house (such as from a smart home controller) with the home owner's or resident's permission or affirmative consent in an effort to identify a property usage type based upon the sensor data.

At predetermined time intervals, the processing element 22 may parse, organize, and summarize the data. For example, every week or every month, the processing element 22 may generate a report that summarizes the activity in and around the house. The report may include activity from each sensor 12. For instance, the report may state activity such as the number of times and/or the time of day that each window (identified by a contact sensor ID) was opened and closed, the number of times and/or the time of day that each door (identified by a door lock ID) was accessed and the time periods during which each was locked, the number of times and/or the time of day when each light switch (identified by light switch ID) was activated, the time of day when each key fob (identified by a fob ID) carried by an individual was in or around the house, the number of times and/or the time of day when motion was detected by each motion detector (identified by a motion sensor ID) along with a determination of whether a human or an animal generated the motion, the time periods when the security system was in each mode of operation, the number of times and/or the time of day when the garage door opener was used, the number of times and/or the time of day when the thermostat was adjusted, and the like. The report may also include thermal information, supplied by the thermostat, contact sensors, motion or infrared sensors, flow sensors, security cameras, or combinations thereof, such as temperatures in the vicinity of the reporting sensors 12 per hour or other time period.

The processing element 22 may analyze the data from the report to determine a property usage type score. The processing element 22 may determine patterns of activity or behavior from the sensor data. In various embodiments, the processing element 22 may utilize machine learning programs or techniques to recognize the patterns. The programs may include curve fitting, regression model builders, convolutional or deep learning neural networks, pattern recognition techniques, or the like. As part of determining the property usage type score, or in addition to determining the property usage type score, the processing element 22 may determine a number of individuals who have been within the house during a certain time period. For example, the processing element 22 may determine, based upon the sensor data, that a total of ten individuals entered the house during a particular day. Since the normal residents of the house may have smartphones, key fobs, or pendants that identify them, the processing element 22 may also be able to distinguish the residents from strangers (or non-residents) that have entered the house. Thus, based upon aspects such as the frequency of occupation of the house, the number of individuals in the house, and the types of individuals in the house, among others, the processing element 22 may determine the property usage type score.

The property usage type score may have a range of values, wherein the value indicates a likelihood of the type of usage for the house on the property. For example, the property usage type score may have a range from 1-100, wherein scores that are closer to 1 may indicate a likelihood that the house is a vacation home, scores that are closer to 50 may indicate a likelihood that the house is a residence with a single family who live in the house full time, and scores that are closer to 100 may indicate a likelihood that the house, or at least a portion thereof, is used as a full-time business, a part-time business, a daycare, or the like. The score may have other ranges of values, wherein the values may be indicative of other types of property usage.

Each score, or range of scores, may also be associated with certain types and levels of coverage. These types and levels of coverage may be established by the insurance provider, the insurance industry, or others and may be received by the processing element 22, or stored in one or more memory elements 20 which are accessed by the processing element 22. For example, a vacation home may require greater levels of coverage than a normal residence because the risk of theft or vandalism is greater, and the damage from fire or water may be greater because the likelihood of people being in the house to prevent or report afire or water leak is lower. In addition, a home business or daycare may require additional coverage, such as certain types and levels of liability coverage that are not required for a normal residence.

The processing element 22 may receive information about the house and household derived from the application for home owners insurance policy data. For example, the processing element 22 may receive information about features of the house such as the address of the house, the age of the house, the construction materials of the house, the number of bedrooms and bathrooms, the value of the house, the tenure of the homeowner's insurance policy, and the like. The processing element 22 may receive information about the household or determine characteristics of the household from analysis of the data (e.g., image, audio, infrared, motion, and sensor data) received from the home (such as from the hub 14 or from another smart home controller, such as the age and gender of each resident, the number and type of pets, and so forth). In addition, the processing element 22 may receive data about the type of coverage that the insurance policy includes, such as deductible values, whether the policy covers full replacement, the type of liability coverage and the amount of liability coverage, etc.

Once the property usage type score has been determined, then the processing element 22 may compare the types and levels of insurance coverage that are associated with the property usage type score with the types and levels of insurance coverage that are included in the homeowner's current insurance policy. If there are differences between the coverage that the homeowner does have and what the homeowner should have based upon the property usage type score, then the processing element 22 may transmit a message to the homeowner, insurance agent, or underwriter to update the coverage of their insurance policy. The message may be in the form of email, SMS text message, voice mail, and so forth. In some cases, a coverage update may be suggested, while in other cases, a coverage update may be required. In certain cases, a change of policy type or a new policy may be required.

In addition to transmitting a message to the homeowner regarding updating their insurance coverage, the processing element 22 may also analyze the data that was received from the sensors 12 to determine what types of sensors are providing the data. In some embodiments, the processing element 22 may create a list or database of types of sensors for which it has received sensor data from a particular house.

Government agencies, safety and security advisory groups, or the insurance provider itself may have created guidelines for types of safety and security products that should be implemented for each type of property usage. For example, it may be suggested that a vacation house include at least a security alarm system, a plurality of smoke detectors and fire sprinklers, and water leak detectors, each of which may transmit sensor data.

It may be further suggested that a house which is used for a business or daycare be equipped with at least monitoring cameras, smoke detectors, and fire sprinklers, each of which may also transmit sensor data. Therefore, the processing element 22 may compare the types of sensors that are suggested to be implemented for the type of property usage indicated by the property usage type score with the type of sensors determined from the sensor data.

If the sensor data indicates a lack of a type of sensor suggested to be implemented for the type of property usage indicated by the property usage type score, then the processing element 22 may transmit a message to the homeowner that they should consider buying and installing the type of sensor that is suggested to be implemented in their house. For example, the processing element 22 may analyze the sensor data from a particular house and may determine a property usage type score which indicates that the house is likely a vacation house. Furthermore, the processing element 22 may create a list of types of sensors for which it received data. If the list does not include all of the types of sensors/safety and security components that should be utilized with a vacation house, then the processing element 22 may transmit a message to the homeowner which suggests that the homeowner buy and install any sensors/safety and security components which were not detected in the sensor data.

Exemplary Computer-Implemented Method

Figure 4A:
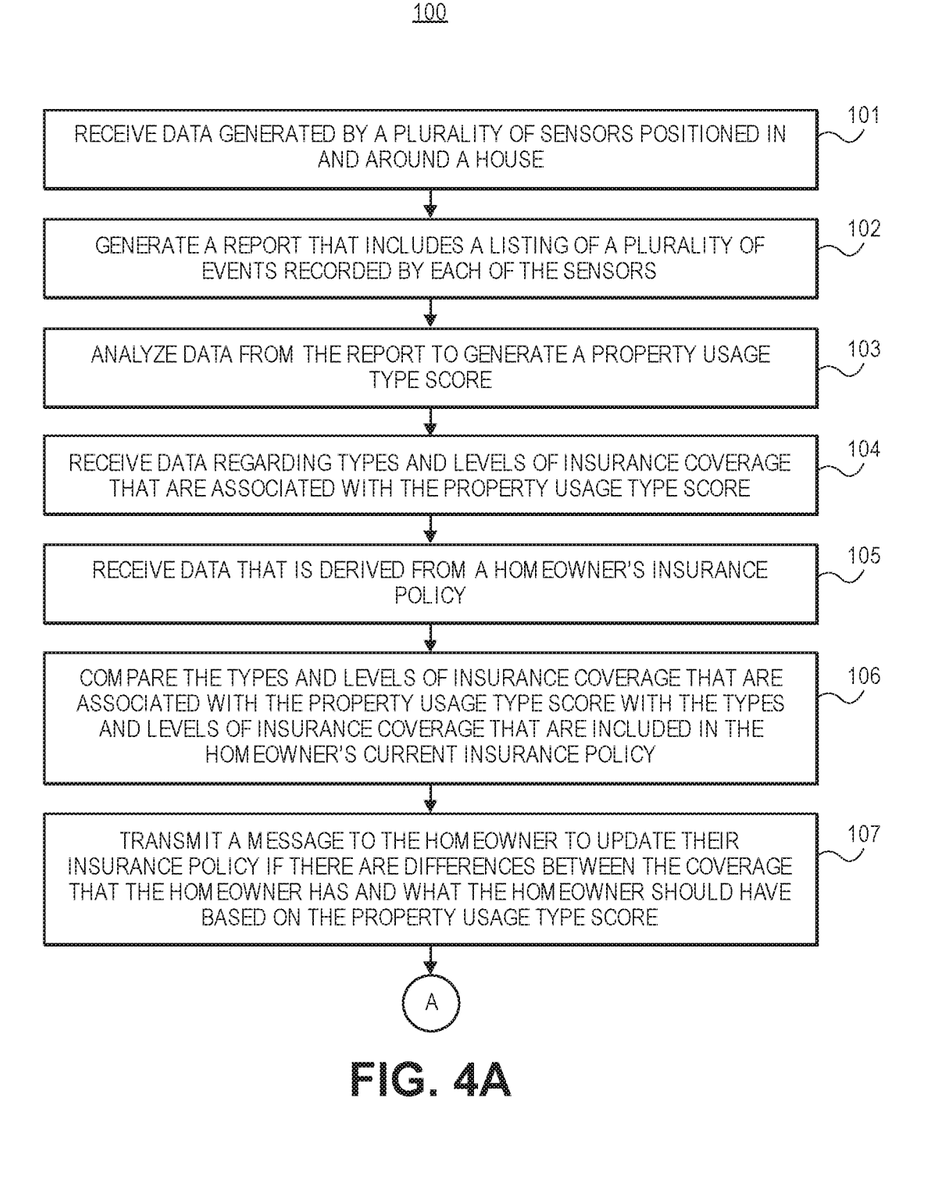
FIGS. 4A and 4B illustrate at least a portion of the steps of an exemplary computer-implemented method for identifying a property usage type based upon sensor data.
Figure 4B:
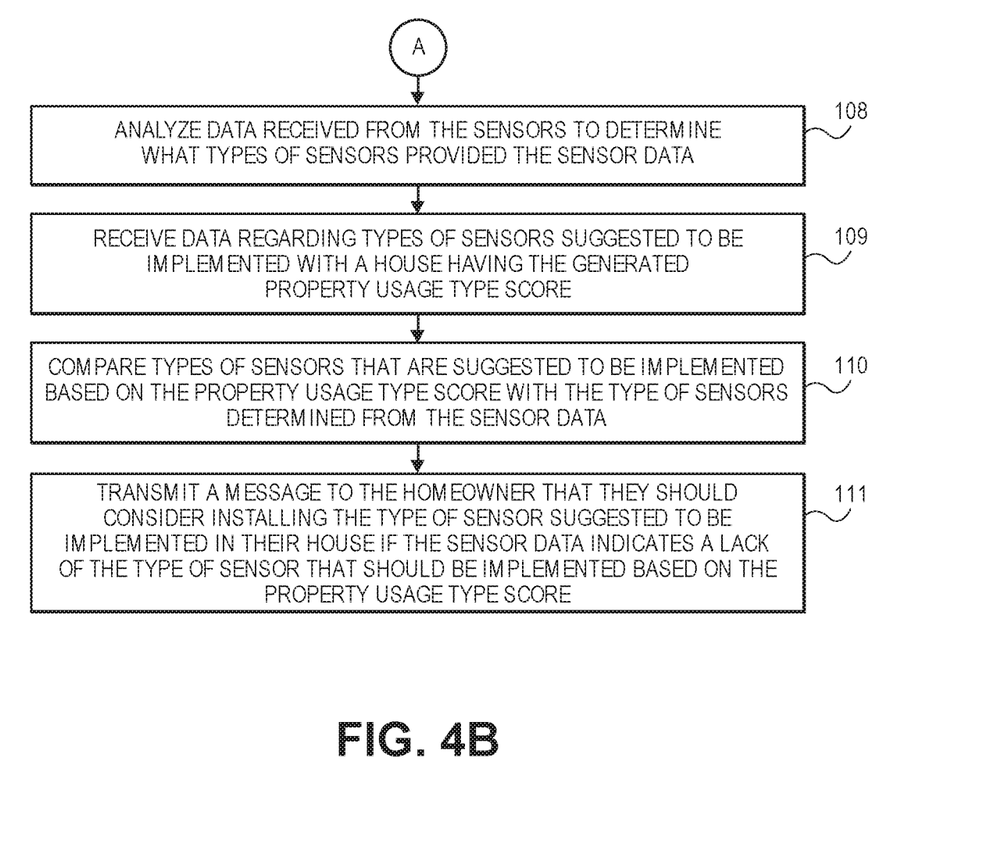

FIGS. 4A and 4B depict a listing of steps of an exemplary computer-implemented method 100 for identifying a property usage type based upon sensor data. The steps may be performed in the order shown in FIGS. 4A and 4B, or they may be performed in a different order. Furthermore, some steps may be performed concurrently as opposed to sequentially. In addition, some steps may be optional. The steps of the computer-implemented method 100 may be performed by the computing device 10.

Referring to step 101, data that was generated by a plurality of sensors 12 may be received. The sensors 12 may be positioned in or around a homeowner's house. The sensors 12 may include, as shown in FIG. 2, examples such as contact sensors which are installed on a window or door, and detect when the window or door is open; thermostats which detect and set the temperature within the house, or an adjustment of the temperature; door locks or door knobs which detect when someone enters or leaves the house, and whether the door was locked or unlocked; key fobs which detect when the possessor of the fob is in or around the house; light switches which detect when someone in the house turns on a light or other electronic device; sensors that detect operation of electronic devices, such as televisions; sensors that detect operation of faucets, showers, or toilets; sensors that monitor water or electrical usage within the home; motion or infrared sensors which detect when people or animals are moving inside or outside the house; sensors that detect the presence of mobile devices within the home; and/or other types of sensors. In some instances, the motion detectors may further detect whether the motion is consistent with human motion or animal motion.

The sensors 12 may further include components not shown in the Figures, such as garage door openers which detect when someone accesses the garage, senior care pendants which send alerts when the possessor of the pendant needs assistance, security systems which may be unarmed when residents are in the house and armed when residents are away, security cameras which capture still images or video, or humans or animals moving about the house, and the like. The sensors 12 each may include communications hardware that allow the sensor 12 to communicate, either through wires or wirelessly, with a central hub 14 (such as a "smart home controller"), which is typically located within the house and transmits signals to a communication network 16 or remote server, such as an insurance provider remote server. In other embodiments, the central hub 14 may not be utilized and each sensor 12 may communicate directly with the communication network 16.

Each sensor 12 may record, for example with a (time of day) timestamp, when activity occurred, such as when a window was opened or closed, when a door was accessed, when someone left or arrived at the house, when certain data was collected or generated, and the like. Some sensors 12, such as key fobs or pendants, may also record an identification of who initiated the activity. After the event occurs, or at predetermined time intervals, the sensor 12 may transmit data, such as a data packet, which includes, for example, an identification of the sensor 12 or electronic device, a timestamp of when the activity occurred, an indication of the activity, such as contact opened, door accessed, etc., and the identification of the person who initiated the activity, if applicable. The data may be transmitted to the central hub 14 or to the computing device 10 (such as a remote server).

Referring to step 102, a report may be generated that includes a listing of a plurality of events (or activity or items) recorded by each of the sensors 12. At predetermined time intervals, the processing element 22 may parse, organize, and summarize the data. For example, every week or every month, the processing element 22 may generate a report that summarizes the activity in and around the house. The report may include activity from each sensor 12. For instance, the report may state activity such as the number of times and/or the time of day that each window (identified by a contact sensor ID) was opened and closed, the number of times each door (identified by a door lock ID) was accessed and the time periods during which each was locked, the number of times and/or the time of day when each light switch (identified by light switch ID) was activated, the time of day when each key fob (identified by a fob ID) carried by an individual was in or around the house, the number of times and/or the time of day when motion was detected by each motion detector (identified by a motion sensor ID) along with a determination of whether a human or an animal generated the motion, the time periods when the security system was in each mode of operation, the number of times and/or the time of day when the garage door opener was used, the number of times and/or the time of day when the thermostat was adjusted, and the like. The report may also include thermal information, supplied by the thermostat, contact sensors, motion sensors, security cameras, or combinations thereof, such as temperatures in the vicinity of the reporting sensors 12 per hour or other time period.

Referring to step 103, data from the report is analyzed to determine a property usage type score. The processing element 22 may determine patterns of activity or behavior from the sensor data. In various embodiments, the processing element 22 may utilize machine learning programs or techniques to recognize the patterns. The programs may include curve fitting, regression model builders, convolutional or deep learning neural networks, or the like. As part of determining the property usage type score, or in addition to determining the property usage type score, the processing element 22 may determine a number of individuals who have been within the house during a certain time period. For example, the processing element 22 may determine, based upon the sensor data, that a total of ten individuals entered the house during a particular day. Since the normal residents of the house may have smartphones, key fobs, or pendants that identify them, the processing element 22 may also be able to distinguish the residents from strangers (or non-residents) that have entered the house. Thus, based upon aspects such as the frequency of occupation of the house, the number of individuals in the house, and the types of individuals in the house, among others, the processing element 22 may determine the property usage type score.

The property usage type score may have a range of values, wherein the value indicates a likelihood of the type of usage for the house on the property. For example, the property usage type score may have a range from 1-100, wherein scores that are closer to 1 may indicate a likelihood that the house is a vacation home, scores that are closer to 50 may indicate a likelihood that the house is a residence with a single family who live in the house full time, and scores that are closer to 100 may indicate a likelihood that the house, or at least a portion thereof, is used as a full-time business, a part-time business, a daycare, or the like. The score may have other ranges of values, wherein the values may be indicative of other types of property usage.

Referring to step 104, data regarding types and levels of insurance coverage that are associated with the property usage type score is received. Each score, or range of scores, may also be associated with certain types and levels of coverage. These types and levels of coverage may be established by the insurance provider, the insurance industry, or others and may be received by the processing element 22, or stored in one or more memory elements 20 which are accessed by the processing element 22. For example, a vacation home may require greater levels of coverage than a normal residence because the risk of theft or vandalism is greater, and the damage from fire or water may be greater because the likelihood of people being in the house to prevent or report a fire or water leak is lower. In addition, a home business or daycare may require additional coverage, such as certain types and levels of liability coverage that are not required for a normal residence.

Referring to step 105, data that is derived from a homeowner's insurance policy may be received. The data may include features of the house, such as the address of the house, the age of the house, the construction materials of the house, the number of bedrooms and bathrooms, the value of the house, the tenure of the homeowner's insurance policy, and the like. The processing element 22 may receive information about the household or determine characteristics of the household from analysis of the sensor data, such as the age and gender of each resident, the number and type of pets, and so forth. In addition, the processing element 22 may receive data about the type of coverage that the insurance policy includes, such as deductible values, whether the policy covers full replacement, the type of liability or other coverage and the level or amount of liability or other coverage, etc.

Referring to step 106, the types and levels of insurance coverage that are associated with the property usage type score are compared with the types and levels of insurance coverage that are included in the homeowner's current insurance policy. The comparison may be performed by the processing element 22.

Referring to step 107, a message is transmitted to the homeowner, insurance agent, or underwriter to update the coverage of their insurance policy if there are differences between the coverage that the homeowner does have and what the homeowner should have based upon the property usage type score. The message may be in the form of email, SMS text message, voice mail, and so forth. In some cases, a coverage update may be suggested, while in other cases, a coverage update may be required. In certain cases, a change of policy type or a new policy may be required.

Referring to step 108, data from the sensors 12 is analyzed to determine what types of sensors are providing the data. In some embodiments, the processing element 22 may create a list or database of types of sensors for which it has received sensor data from a particular house.

Referring to step 109, data regarding types of sensors suggested to be implemented with a house having the determined property usage type score is received. Government agencies, safety and security advisory groups, or the insurance provider itself may have created guidelines for types of safety and security products that should be implemented for each type of property usage. For example, it may be suggested that a vacation house include at least a security alarm system, a plurality of smoke detectors and fire sprinklers, and water leak detectors, each of which may transmit sensor data. It may be further suggested that a house which is used for a business or daycare be equipped with at least monitoring cameras, smoke detectors, and fire sprinklers, each of which may also transmit sensor data.

Referring to step 110, the types of sensors that are suggested to be implemented for the type of property usage indicated by the property usage type score are compared with the type of sensors determined from the sensor data. The comparison may be performed by the processing element 22.

Referring to step 111, a message is transmitted to the homeowner that they should consider buying and installing the type of sensor that is suggested to be implemented in their house if the sensor data indicates a lack of a type of sensor that should be implemented based upon the property usage type score. For example, the processing element 22 may analyze the sensor data from a particular house and may determine a property usage type score which indicates that the house is likely a vacation house. Furthermore, the processing element 22 may create a list of types of sensors for which it received data. If the list does not include all of the types of sensors/safety and security components that should be utilized with a vacation house, then the processing element 22 may transmit a message to the homeowner which suggests that the homeowner buy and install any sensors/safety and security components which were not detected in the sensor data.

Exemplary Computer-Implemented Method for Identifying a Property Usage Type Based Upon Sensor Data In a first aspect, a computer-implemented method for identifying a property usage type based upon sensor data may be provided. The method may include, with customer's permission or affirmative consent: (1) receiving data that was generated by a plurality of sensors positioned in and around a house; (2) generating a report that includes a listing of a plurality of events recorded by each sensor; (3) analyzing data from the report to determine a property usage type score; (4) receiving data regarding types and levels of insurance coverage that are associated with the property usage type score; (5) receiving data that is derived from a homeowner's insurance policy including types and levels of insurance coverage included in the insurance policy; (6) comparing the types and levels of insurance coverage that are associated with the property usage type score with the types and levels of insurance coverage that are included in the homeowner's current insurance policy; and/or (7) transmitting a message to the homeowner, insurance agent, or underwriter to update the insurance policy if there are differences between the insurance coverage that the homeowner has and the insurance coverage the homeowner should have based upon the property usage type score. The method may include additional, fewer, or alternative actions, including those discussed elsewhere herein.

For instance, the method may include: analyzing data received from the sensors to determine what types of sensors provided the data; receiving data regarding types of sensors suggested to be implemented with a house having the determined property usage type score; comparing types of sensors that are suggested to be implemented based upon the property usage type score with the type of sensors determined from the sensor data; and/or transmitting a message to the homeowner that they should consider installing the type of sensor suggested to be implemented in their house if the sensor data indicates a lack of the type of sensor that should be implemented based upon the property usage type score. In addition, analyzing data from the report to determine a property usage type score further includes determining a number of individuals who have been within the house during a first time period. Furthermore, a first range of values of the property usage type score indicates that the house is likely a residence with a single family who live in the house full time; a second range of values of the property usage type score indicates that the house is likely a full-time or part-time business; a third range of values of the property usage type score indicates that the house is likely a vacation home; and/or a fourth range of values of the property usage type score indicates that the house is likely a daycare.

Exemplary Computing Device for Identifying a Property Usage Type Based Upon Sensor Data In another aspect, a computing device for identifying a property usage type based upon sensor data may be provided. The computing device may include a communication element, a memory element, and/or a processing element. The communication element may receive data generated by a plurality of sensors positioned in and around a house and data that is derived from a homeowner's insurance policy. The memory element may be electronically coupled to the communication element and may store data and executable instructions. The processing element may be electronically coupled to the communication element and the memory element. The processing element may be configured to receive data that was generated by a plurality of sensors positioned in and around a house; generate a report that includes a listing of a plurality of events recorded by each sensor; analyze data from the report to determine a property usage type score; receive data regarding types and levels of insurance coverage that are associated with the property usage type score; receive data that is derived from a homeowner's insurance policy including types and levels of insurance coverage included in the insurance policy; compare the types and levels of insurance coverage that are associated with the property usage type score with the types and levels of insurance coverage that are included in the homeowner's current insurance policy; and/or transmit a message to the homeowner, insurance agent, or underwriter to update the insurance policy if there are differences between the insurance coverage that the homeowner has and the insurance coverage the homeowner should have based upon the property usage type score. The computing device may include additional, fewer, or alternate components and/or functionality, including that discussed elsewhere herein.

For instance, the processing element may be further configured to: analyze data received from the sensors to determine what types of sensors provided the data; receive data regarding types of sensors suggested to be implemented with a house having the determined property usage type score; comparing types of sensors that are suggested to be implemented based upon the property usage type score with the type of sensors determined from the sensor data; and/or transmit a message to the homeowner that they should consider installing the type of sensor suggested to be implemented in their house if the sensor data indicates a lack of the type of sensor that should be implemented based upon the property usage type score. In addition, analyzing data from the report to determine a property usage type score further includes determining a number of individuals who have been within the house during a first time period. Furthermore, a first range of values of the property usage type score indicates that the house is likely a residence with a single family who live in the house full time; a second range of values of the property usage type score indicates that the house is likely a full-time or part-time business; a third range of values of the property usage type score indicates that the house is likely a vacation home; and/or a fourth range of values of the property usage type score indicates that the house is likely a daycare.

Exemplary Computer-Readable Medium for Identifying a Property Usage Type Based Upon Sensor Data In yet another aspect, a computer-readable medium for identifying a property usage type based upon sensor data may be provided. The computer-readable medium may include an executable program stored thereon, wherein the program instructs a processing element of a computing device to perform the following steps: (1) receiving data that was generated by a plurality of sensors positioned in and around a house; (2) generating a report that includes a listing of a plurality of events recorded by each sensor; (3) analyzing data from the report to determine a property usage type score; (4) receiving data regarding types and levels of insurance coverage that are associated with the property usage type score; (5) receiving data that is derived from a homeowner's insurance policy including types and levels of insurance coverage included in the insurance policy; (6) comparing the types and levels of insurance coverage that are associated with the property usage type score with the types and levels of insurance coverage that are included in the homeowner's current insurance policy; and/or (7) transmitting a message to the homeowner, insurance agent, or underwriter to update the insurance policy if there are differences between the insurance coverage that the homeowner has and the insurance coverage the homeowner should have based upon the property usage type score. The program stored on the computer-readable medium may instruct the processing element to perform additional, fewer, or alternative actions, including those discussed elsewhere herein.

For instance, the program may instruct the processing element to: analyze data received from the sensors to determine what types of sensors provided the data; receive data regarding types of sensors suggested to be implemented with a house having the determined property usage type score; comparing types of sensors that are suggested to be implemented based upon the property usage type score with the type of sensors determined from the sensor data; and/or transmit a message to the homeowner that they should consider installing the type of sensor suggested to be implemented in their house if the sensor data indicates a lack of the type of sensor that should be implemented based upon the property usage type score. In addition, analyzing data from the report to determine a property usage type score further includes determining a number of individuals who have been within the house during a first time period. Furthermore, a first range of values of the property usage type score indicates that the house is likely a residence with a single family who live in the house full time; a second range of values of the property usage type score indicates that the house is likely a full-time or part-time business; a third range of values of the property usage type score indicates that the house is likely a vacation home; and/or a fourth range of values of the property usage type score indicates that the house is likely a daycare.

Another Exemplary Computer-Implemented Method

Figure 5A:
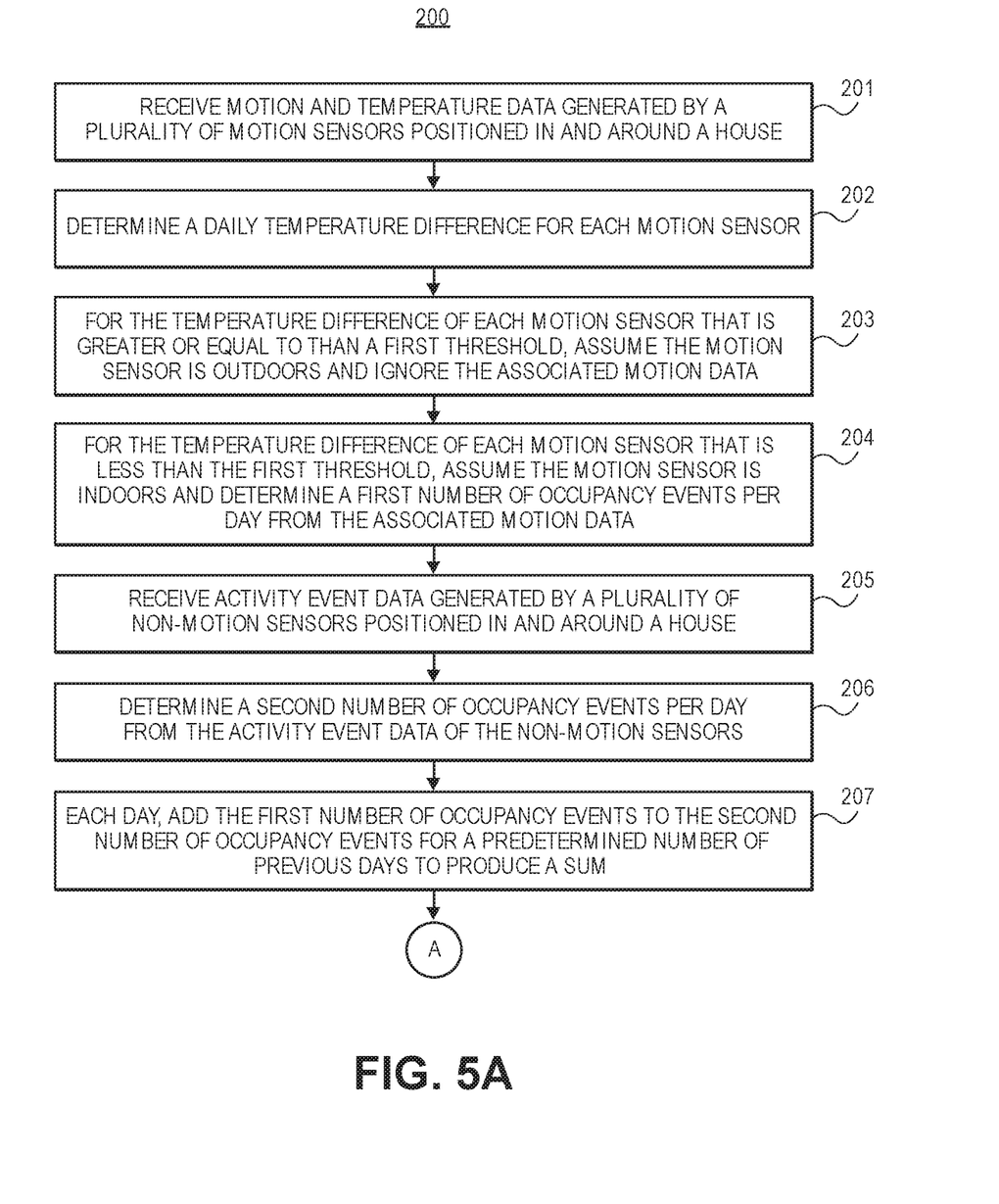
FIGS. 5A and 5B illustrate at least a portion of the steps of an exemplary computer-implemented method for determining if a homeowner is on vacation.
Figure 5B:
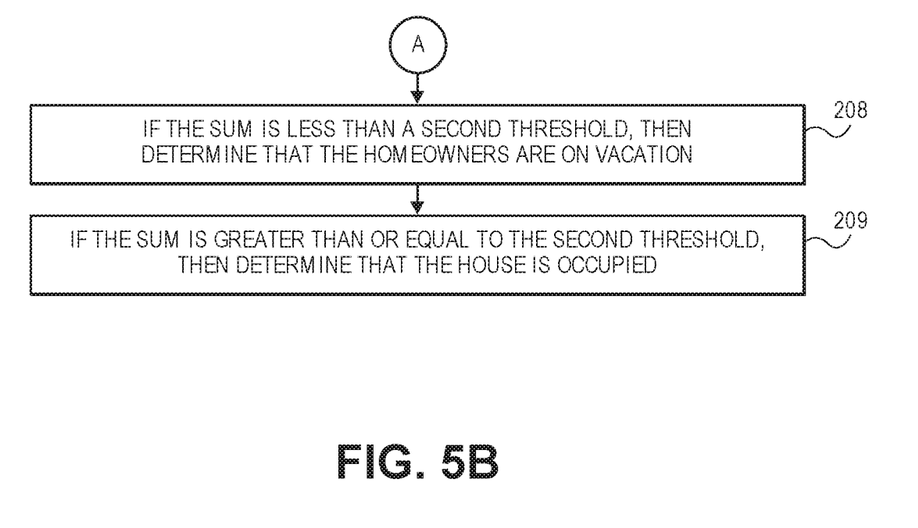

FIGS. 5A and 5B depict a listing of steps of an exemplary computer-implemented method 200 for determining if a homeowner is on vacation. The steps may be performed in the order shown in FIGS. 5A and 5B, or they may be performed in a different order. Furthermore, some steps may be performed concurrently as opposed to sequentially. In addition, some steps may be optional. The steps of the computer-implemented method 200 may be performed by the computing device 10.

Referring to step 201, data that was generated by a plurality of motion sensors is received. The motion sensors may be a subset of the sensors 12 discussed above and may be positioned indoors, such as mounted on a wall of a room or hallway, or outdoors, such as near an entryway, a walkway, or a driveway. The data that the motion sensors generate may include a plurality of entries—one entry from each motion sensor for each motion event that occurred, wherein a motion event is any kind of movement, such as by humans or animals, detected by the sensor. In some embodiments, the entry may include a timestamp indicating when the motion event started along with a timestamp of when the motion event ended. In other embodiments, the entry may include a timestamp indicating when the motion event started along with a value of the duration of the motion event. The entry may further include temperature data indicating a value of the ambient temperature in the vicinity of the motion sensor when the motion event started. In addition, each entry may include an identification number, code, or name which identifies the particular sensor that generated the motion data. The data may be received by the computing device 10 as each motion event occurs, in near real time, or on a periodic basis, such as once per hour or once per day.

Referring to step 202, a daily temperature difference from each motion sensor is determined. The determination involves subtracting the lowest temperature value of the day from the highest temperature value of the day.

Referring to steps 203 and 204, each motion sensor whose temperature difference is above or equal to a first threshold is assumed to be outdoors. The motion data entries from the motion sensor are then ignored and not used in any further calculations. A value of an exemplary first threshold may be 15 degrees Fahrenheit, which may be at least an average outdoor temperature difference per day. Each motion sensor whose temperature difference is less than the first threshold is assumed to be indoors. The associated motion data entries are then used to determine a first number of occupancy events per day. For example, the first number of occupancy events may be a sum or total of the counts of all of the motion data entries for each indoor motion sensor per day.

Referring to step 205, data that was generated by a plurality of non-motion sensors is received. The non-motion sensors may be a subset of the sensors 12 discussed above and may include contact sensors which are installed on a window or door, and detect when the window or door is open; thermostats which detect and set the temperature within the house, or an adjustment of the temperature; door locks or door knobs which detect when someone enters or leaves the house, and whether the door was locked or unlocked; key fobs which detect when the possessor of the fob is in or around the house; light switches which detect when someone in the house turns on a light or other electronic device; sensors that detect operation of electronic devices, such as televisions; sensors that detect operation of faucets, showers, or toilets; sensors that monitor water or electrical usage within the home; sensors that detect the presence of mobile devices within the home; and/or other types of sensors. The non-motion sensors may further include components not shown in the Figures, such as garage door openers which detect when someone accesses the garage, senior care pendants which send alerts when the possessor of the pendant needs assistance, security systems which may be unarmed when residents are in the house and armed when residents are away, security cameras which capture still images or video, or humans or animals moving about the house, and the like.

The data that the non-motion sensors generate may include a plurality of entries—one entry from each sensor for each activity event. The entry may include, among other data, an identification number, code, or name which identifies the particular sensor that generated the entry, a number, code, or name which identifies the activity event, such as opening or closing a door or window, accessing of a thermostat, entry or exit of a person with a key fob, a smartphone, or other electronic device transmitting RF signals, operation of faucets, showers, or toilets, and so forth, and a timestamp of when the activity event occurred.

Referring to step 206, a second number of occupancy events is determined. As an example, the second number of occupancy events may be a sum or total of the counts of all of the activity events for each non-motion sensor per day.

Referring to step 207, the first number of occupancy events and the second number of occupancy events for a predetermined number of days are added together to produce a sum. For example, the first number of occupancy events for the past two days are added to the second number of occupancy events for the past two days. This addition is performed once per day in order to check the occupancy of the house for a certain time window, such as the past two days. It is thought that two days is a likely minimum number of days for the homeowners to take a vacation.

Referring to steps 208 and 209, it is determined that the homeowners are on vacation if the sum from step 207 is less than a second threshold. A value of the second threshold may be determined for each house based on the behavior of the homeowners. For example, a mean, a standard deviation, and other statistical data may be calculated for the sum of the first and second numbers of occupancy events for one day resulting from data collected over time from each home. A minimum number of occupancy events per day may be determined, among other methods, as the mean minus a certain number of standard deviations. The value of the second threshold may be calculated as the minimum number of occupancy events per day times the predetermined number of days from step 207, which in this case is two. In some embodiments, the value of the second threshold may have a certain minimum, which takes into account a small number of occupancy events generated by pets in the house and perhaps neighbors coming to check on the house or pets while the homeowners are gone. If the sum from step 207 is greater than or equal to the second threshold, then it is likely that the homeowners are not on vacation and the house is occupied.

Exemplary Computer-Implemented Method for Determining if a Homeowner is on Vacation In yet another aspect, a computer-implemented method for determining if a homeowner is on vacation may be provided. The method may include: (1) receiving data that was generated by a plurality of motion sensors positioned in and around a house, the data including motion events and temperature data from each motion sensor; (2) determining a daily temperature difference for each motion sensor; (3) determining a first number of occupancy events per day as a total of motion events from motion sensors whose daily temperature difference is less than a first threshold; (4) receiving data that was generated by a plurality of non-motion sensors positioned in the house, the data including activity events data from each non-motion sensor; (5) determining a second number of occupancy events per day as a total of activity events from the non-motion sensors; (6) adding, once per day, the first number of occupancy events to the second number of occupancy events for a predetermined number of previous days to produce a sum; and (7) determining that the homeowner is on vacation if the sum is less than a second threshold. The method may include additional, fewer, or alternative actions, including those discussed elsewhere herein.

For instance, the method may include: determining that the house is occupied if the sum is greater than or equal to the second threshold; determining that a motion sensor is an indoor motion sensor if the associated temperature difference is less than the second threshold; and determining that a motion sensor is an outdoor motion sensor if the associated temperature difference is greater than or equal to the second threshold. Furthermore, the daily temperature difference for each motion sensor is determined as a daily high temperature value minus a daily low temperature value; and the predetermined number of days is two days.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A computer-implemented method for determining if a house is unoccupied for an extended period, the computer-implemented method comprising:

receiving data that was generated by a plurality of motion sensors positioned in and around a house, the data including motion events and temperature data in the vicinity of each motion sensor;

determining a temperature difference for each motion sensor over a first period of time;

determining that a motion sensor is an indoor motion sensor if the associated temperature difference is less than a first threshold;

determining a first number of occupancy events over a second period of time as a total of motion events from the motion sensors whose temperature difference over the first period of time is less than the first threshold;

receiving data that was generated by a plurality of non-motion sensors positioned in the house, the data including activity events data from each non-motion sensor;

determining a second number of occupancy events over the second period of time as a total of activity events from the non-motion sensors;

adding the first number of occupancy events to the second number of occupancy events for a third period of time to produce a sum; and determining that the home is unoccupied if the sum is less than a second threshold.

2. The computer-implemented method of claim 1, further comprising determining that the house is occupied if the sum is greater than or equal to the second threshold.

3. The computer-implemented method of claim 1, further comprising determining that a motion sensor is an outdoor motion sensor if the associated temperature difference is greater than or equal to the first threshold.

4. The computer-implemented method of claim 1, wherein the temperature difference for each motion sensor is determined as a daily high temperature value minus a daily low temperature value.

5. The computer-implemented method of claim 1, wherein the third period of time is two days.

6. The computer-implemented method of claim 1, wherein the non-motion sensors include a contact sensor installed on a window to determine when the window is opened or closed.

7. The computer-implemented method of claim 1, wherein the non-motion sensors include a door lock installed on a door to detect when the door is locked or unlocked.

8. The computer-implemented method of claim 1, wherein the non-motion sensors include a key fob which detects when a possessor of the fob is in or around the house.

9. A computer-implemented method for determining if a house is unoccupied for an extended period, the computer-implemented method comprising:

receiving data that was generated by a plurality of motion sensors positioned in and around a house, the data including motion events and temperature data fin the vicinity of each motion sensor; determining a temperature difference for each motion sensor over a first period of time;

determining that a motion sensor is an indoor motion sensor if the associated temperature difference is less than a first threshold;

determining that a motion sensor is an outdoor motion sensor if the associated temperature difference is greater than or equal to the first threshold;

determining a first number of occupancy events over a second period of time as a total of motion events from indoor motion sensors;

receiving data that was generated by a plurality of non-motion sensors positioned in the house, the data including activity events data from each non-motion sensor;

determining a second number of occupancy events over the second period of time as a total of activity events from the non-motion sensors;

adding the first number of occupancy events to the second number of occupancy events for a third period of time to produce a sum;

determining that the house is unoccupied if the sum is less than a second threshold; and determining that the house is occupied if the sum is greater than or equal to the second threshold.

10. The computer-implemented method of claim 9, wherein the non-motion sensors include a contact sensor installed on a window to determine when the window is opened or closed, a door lock installed on a door to detect when the door is locked or unlocked, and a key fob which detects when a possessor of the fob is in or around the house.

11. A computer system configured to determine if a house is unoccupied for an extended period of time, the computer system comprising one or more processors, servers, sensors, and/or transceivers configured to:

receive data that was generated by a plurality of motion sensors positioned in and around a house, the data including motion events and temperature data in the vicinity of each motion sensor;

determine a temperature difference for each motion sensor over a first period of time;

determine that a motion sensor is an indoor motion sensor if the associated temperature difference is less than a first threshold;

determine a first number of occupancy events during a second period of time as a total of motion events from the motion sensors whose temperature difference is less than the first threshold;

receive data that was generated by a plurality of non-motion sensors positioned in the house, the data including activity events data from each non-motion sensor;

determine a second number of occupancy events during the second period of time as a total of activity events from the non-motion sensors;

add the first number of occupancy events to the second number of occupancy events for a third period of time to produce a sum; and determine that the house is unoccupied if the sum is less than a second threshold.

12. The computer system of claim 11, further configured to determine that the house is occupied if the sum is greater than or equal to the second threshold.

13. The computer system of claim 11, further configured to determine that a motion sensor is an outdoor motion sensor if the associated temperature difference is greater than or equal to the first threshold.

14. The computer system of claim 11, wherein the temperature difference for each motion sensor is determined as a daily high temperature value minus a daily low temperature value.

15. The computer system of claim 11, wherein the third period of time is two days.

16. The computer system of claim 11, wherein the non-motion sensors include a contact sensor installed on a window to determine when the window is opened or closed.

17. The computer system of claim 11, wherein the non-motion sensors include a door lock installed on a door to detect when the door is locked or unlocked.

18. The computer system of claim 11, wherein the non-motion sensors include a key fob which detects when a possessor of the fob is in or around the house.

* * * * *